United States Patent Office 3,434,949
Patented Mar. 25, 1969

3,434,949
HYDRAZINE PRODUCTION
Francis T. Jones, Sloatsburg, N.Y., and Thomas J. Sworski, Oak Ridge, Tenn., assignors to Union Carbide Corporation, a corporation of New York
No Drawing. Filed July 6, 1964, Ser. No. 380,682
Int. Cl. C01b 21/16; B01j 1/10
U.S. Cl. 204—157.1                                                    6 Claims

ABSTRACT OF THE DISCLOSURE

Hydrazine is produced by contacting gaseous ammonia with ionizing radiation at elevated temperatures and a specified residence time and immediately separating hydrazine from the product gas.

---

This invention relates to an improved method for producing hydrazine by subjecting gaseous ammonia to ionizing radiation.

Hydrazine is a chemical which has been recently found to possess a great number of valuable industrial uses. Hydrazine is one of the principal constituents in certain rocket fuels. Also, it has unusual properties as a reducing agent, for example, in the reduction of silver or the like metal salt solutions in spraying processes. In organic chemistry, hydrazine is now being used extensively in the development of new drugs and various bio-chemicals and dyes.

There is little doubt that the present high cost of hydrazine is a major obstacle to more extensive commercial development, the high cost arising from the expenses involved in manufacture rather than from the value of the basic raw materials. The only significant commercial method of hydrazine manufacture is the Raschig process, whereby ammonia or urea is oxidized by sodium hypochlorite in aqueous solution. However the separation of hydrazine from water is difficult and expensive since a constant boiling mixture exists at 58 mol–percent hydrazine. Higher concentrations require expensive dehydrating procedures. Other processes which have been employed include photolytic or electrical decomposition of ammonia, electrolytic reduction of amides, controlled oxidation of ammonia by oxygen or nitric oxide, and pyrolysis. Best conversions by any of these latter processes are reportedly less than 0.5% and not commercially feasible.

In a recently developed liquid phase process for producing hydrazine, liquid ammonia was exposed to ionizing radiation in the form of a highly charged fission recoil released by fission of uranium-235. An important factor in the cost of chemicals produced by ionizing radiation is the efficiency with which this energy is used. A conventional method employed by those skilled in the art for denoting this efficiency is to report the G-value, i.e. the molecules of product formed per 100 electron volts of energy absorbed. G-values as high as 2.2 for hydrazine production from liquid ammonia have been reported in which the fissionable uranium-235 is suspended as finely-divided uranium dioxide particles.

An object of this invention is to proivde an improved process for producing hydrazine.

Another object is to provide an improved process for producing hydrazine from ammonia in the gas phase and by ionizing radiation.

Further objects will be apparent from the ensuing disclosure and the appended claims.

Under static conditions, decomposition of ammonia by ionizing radiation yields nitrogen and hydrogen as the predominant products with little, if any, hydrazine produced. It has been unexpectedly discovered that hydrazine may be produced in a highly efficient manner by contacting a gaseous ammonia stream with ionizing radiation at elevated temperature between about 100° C. and 400° C., at least atmospheric pressure and an average residence time or less than 20 seconds, withdrawing the product gas from such contact and immediately separating hydrazine from such product gas. Using this method we have obtained a G-value of 4.0 at 300° C., which is higher than any yield thus far reported for liquid or gas. This is surprising since both electric discharge and photolysis studies of ammonia indicate that the resulting hydrazine is at least partially destroyed by hydrogen atom attack at room temperature, and such destruction might be expected to accelerate at elevated temperatures. For example, the passage of an electric discharge through gaseous ammonia results in activated ammonia molecules which yield amino radicals ($NH_2$) and hydrogen atoms. Hydrazine molecules result from the union of pairs of amino radicals, but the yields are low partly because this reaction must compete with the re-formation of ammonia by reaction of an amino radical with a hydrogen atom and by reaction of hydrazine with hydrogen atoms or other radicals. Exemplary reactions are as follows:

$$NH_3 \rightarrow NH_2 + H \tag{1}$$
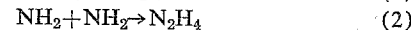
$$NH_2 + NH_2 \rightarrow N_2H_4 \tag{2}$$
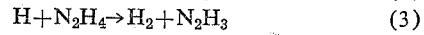
$$H + N_2H_4 \rightarrow H_2 + N_2H_3 \tag{3}$$

The unexpectedly higher net hydrazine recovery at elevated temperatures of 100–400° C. rather than lower temperatures may be due to the reaction of hydrogen atoms with ammonia to produce amine radicals which can then combine with each other to form hydrazine:

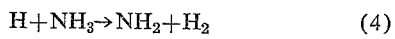
$$H + NH_3 \rightarrow NH_2 + H_2 \tag{4}$$

This reaction would therefore not only increase the yield of hydrazine, but decrease the number of hydrogen atoms reacting via reaction (3) to destroy hydrazine. The high activation energy expected for reaction (4) in comparison with that for reaction (3) would make reaction (4) increasingly favored as the temperature is increased. It should be understood that we do not wish to be bound by the above theory, but it represents the most plausible explanation for our unexpected discovery.

Any convenient source of ionizing radiation can be employed in the process of this invention. Suitable sources of ionizing radiation include gamma ray emitting isotopes such as $Co^{60}$ and $Cs^{137}$, spent nuclear fuel elements, X-rays such as those produced by commercial X-ray machines, electrons from high voltage accelerators and resonance transformers, mixed neutron-gamma ray radiation from nuclear reactors, and the like. Two particularly convenient radiation sources are Van de Graaff accelerators and fission recoils from nuclear reactors designed specifically for chemical processing. Ionizing radiation useful in the process of this invention will generally have an energy in the range from about 0.05 mev. (million electron volts) to about 120 mev. The dose rate depends primarily on the intensity of the radiation source, while the total radiation dose depends on dose rate and the geometry of the system in which the gas mixture being irrdiated is confined. The optimum dose rate and total dose can be readily determined by those skilled in the art.

Sub-atmospheric pressures are unsuitable because the low gas densities necessitate excessively long periods for energy transfer to a reasonable quantity of gas and resultant hydrazine production.

In the process of this invention the gaseous ammonia may be contacted with the ionizing radiation and the hydrazine product recovered from the mixture by conventional procedures. Several such methods are set forth in detail in the illustrative examples hereinbelow.

In the examples, yields of observed products are denoted parenthetically, such as $G(N_2H_4)$, $G(N_2)$ and $G(H_2)$. G-values for hydrazine product formation are related to conventional energy units by the following relation:

Kilowatt hours/pound of hydrazine product=38.0/G  (5)

The equipment and procedures used in the examples were as follows:

Stainless steel irradiation cells were used in the form of cylindrical cells about four inches in height and two inches in diameter with a vacuum-tight window of 0.004 in. aluminum at one end to admit the electron beam. The cell was heated by electrical heating tape wrapped around the outside of the cell and imbedded in refractory cement, and the temperature was measured with several thermocouples located at various places along the outside of the cell wall. The reactant gas entered the cell through a sidearm near one end of the cylinder and passed out of the cell through another sidearm located near the other end of the cell. Before entering the cell the gas was passed through a preheater maintained at the same temperature as the cell, in order to reduce fluctuations in the cell temperature. The cell volume was approximately 170 milliliters.

The radiation source was a 1.0 mev. Van de Graaff accelerator modified to generate electrons. The electron beam was controlled by means of a shutter mechanism located between the irradiation cell and the end of the accelerator drift tube, and the distance between irradiation cell and drift tube was maintained at less than one inch to minimize energy loss to the air. The accelerator was operated at electron beam currents between 0.05 and 30.0 microamperes, measured on the shutter. Energy absorption in ammonia was based on nitrous oxide dosimetry using a G-value of 10.0 for nitrogen production at 24° C. Absolute determination of the G-value of nitrogen from nitrous oxide, using saturation ionization current measurements, yielded the value of 10.0±0.2 between 200 and 600 torr (mm. Hg) at 24° C. Energy absorption in ammonia relative to nitrous oxide was calculated on the basis of relative total stopping powers for 1.0 mev. electrons using the Bethe equation. This correlation procedure is described more completely in "Radiation Dosimetry" by J. W. Boag (1956).

The experiments were performed in a recirculatory loop of 1100 cc. total volume which consisted of the following major components: irradiation cell, hydrazine scrubber, gas sampler, and a recirculatory diaphragm pump. The irradiation cell and diaphragm pump were constructed of stainless steel; all other parts were constructed of Pyrex glass. The treated ammonia gas was passed through the irradiation cell and the resulting product mixture directed to a pool of liquid ammonia at 35° C. The mixture was bubbled through this pool and the hydrazine scrubbed out. The remaining ammonia, hydrogen and nitrogen in the vapor emerging from the pool was passed through a recirculatory pump to the previously described irradiation cell. Hydrazine content in the liquid ammonia pool after each experiment was determined by the colorimetric method employing p-dimethylaminobenzaldehyde, as described by C. W. Watt and J. D. Chrisp in "Analytical Chemistry," 24, 2006 (1952).

Gas samples were periodically withdrawn from the recirculating gas to monitor the rate of nitrogen and hydrogen production in the system. The experimental procedure was to extract a certain volume of gas sample, condense the ammonia, burn the hydrogen in the presence of added oxygen and measure the loss of volume. The noncombustible gas was assumed to be nitrogen. This procedure was repeated several times during each experiment, so that $G(H_2)$ and $G(N_2)$ in the succeeding examples represent an average of numerous samples. All experimental results were obtained at radiation doses which were low enough to ensure that nitrogen and hydrogen production was linear with energy absorption. Also, it was experimentally verified that hydrazine, nitrogen and hydrogen were the only major products from ammonia, since the H/N ratio was found to be 3.0. Thus, within the accuracy of the analyses, complete mass balance was achieved.

Example 1

In one set of experiments, an electron beam current of 5 microamperes was maintained constant and hydrazine G-values were determined at different temperatures between 24° C. and 300° C. for gas flow rates of 1.2, 2.5 and 4.2 liters per minute of feed gas. Since the irradiation cell had a volume of 170 ml., these flow rates correspond to average residence times of 8.5, 4.08 and 2.45 seconds, respectively, for hydrazine in the irradiation cell. The results of these experiments are summarized in Table I.

TABLE I

| Temperature (° C.) | Feed gas flow rate (liters/minute) | | |
|---|---|---|---|
| | 1.2 | 2.5 | 4.2 |
| 24 | 0.39 | ¹ 0.62 | 0.58 |
| 100 | | 1.17 | |
| 150 | | 1.44 | |
| 200 | | 2.17 | |
| 300 | 1.38 | 2.97 | 2.99 |

¹ Average of three determinations.

Example 2

In another series of experiments, the fed gas-ionizing radiation contact temperature was maintained constant at 300° C., the feed gas flow rate was kept at 2.5 liters per minute and the accelerator beam current was varied from 0.05 microampere to 30.0 microamperes. In this manner the dependence of hydrazine G-value on radiation intensity was isolated and determined.

These experiments are summarized in Table II.

TABLE II

| Accelerator beam current (microamperes) | $G(N_2H_4)$ | $G(N_2)$ | $G(H_2)$ | H/N |
|---|---|---|---|---|
| 0.05 | 3.95 | | | |
| 1.0 | 4.09 | 2.50 | 11.8 | 3.03 |
| 5.0 | 2.97 | 3.87 | 15.9 | 3.19 |
| 30.0 | 1.92 | 3.75 | 12.7 | 2.91 |

An examination of Tables I and II reveals that at constant feed flow rate and electron beam current, the hydrazine G-value increases from 24° C. to 300°C. The latter was an upper limit for the particular test equipment and does not represent a temperature limit of the instant method. It is believed to be operable over a range of 100° C. to about 400° C. The latter figure is based on an expectancy that above about 400° C., hydrazine may decompose at a prohibitively rapid rate. A feed gas-ionizing radiation contact temperature range of 200–300° C. is preferred because in this range the advantage of an increased radiolytic production of hydrazine with temperature is not seriously negated by the expected high-temperature decomposition of hydrazine.

Table I reveals that at constant temperature, e.g., 300° C., and constant radiation intensity, the hydrazine G-value increases with increasing flow rate and appears to be reaching a limiting value at high flow rate. Likewise, at 300° C. and a constant flow rate of 2.5 liters/minute, the G-value of hydrazine is shown in Table II to increase with decreasing accelerator beam current and appears to have reached a limiting value of 4.0 at low intensity. Both these phenomena are explicable on the assumption that the rate of destruction of hydrazine is a function of the hydrazine concentration in the irradiation cell, among other things. Thus, both high flow rate and low radiation intensity tend to reduce hydrazine steady-state concentration, thereby reducing decomposition.

It was confirmed from Examples 1 and 2 that the observed G-values of hydrazine for any particular temperature result from two competing processes: the production of hydrazine and the decomposition of hydrazine by transient intermediates such as the free radicals H and $NH_2$. The extent of decomposition was determined by three experimental variables: (a) flow rate, which determines the average residence time of hydrazine in the irradiation cell, (b) radiation intensity, which determines the steady-state concentration of transient intermediates in the irradiation cell, and (c) the temperature, which determines the relative rates of those hydrazine-forming and decomposition reactions which have appreciable activation energies. As previously indicated, higher hydrazine G-values are attained with relatively high flow rates and low radiation intensities, but these variables are limited by equipment and operability considerations. The present invention deals with superambient temperatures for gaseous ammonia-ionizing radiation contact as a method for realizing far higher hydrazine production efficiency than heretofore attained.

From the Example 1 and 2 tests, it was concluded that the average residence time for the gaseous ammonia-ionizing radiation contact should be less than about 20 seconds. Longer contact times do not provide higher hydrazine yields in the 100°–400° C. range as compared to ambient temperature. These tests also revealed that when the ionizing radiation is in the form of an electron beam from a high voltage accelerator, the current should be at least 30 microamperes for commercially useable yields of hydrazine.

The preceding discussion has dealt primarily with ionizing radiation from Van de Graaff electron accelerators. Radiation in the form of fission recoils from nuclear reactors may also be used in the practice of this invention. For example, the fission recoil fragments may be generated from fission of a suitable fuel contained in a dust, foil, fiber, or other physical form within the irradiation cell in a nuclear reactor. Elevated temperatures may be attained by self-heating or from an auxiliary source of energy.

Although preferred embodiments have been described in detail, it will be recognized that obvious modifications and variations may be practiced without departing from the spirit and scope of the invention. For example, instead of separating hydrazine from ammonia by scrubbing in liquid ammonia, this may be accomplished by other well-known methods such as gas chromatography, selective adsorption by a solid adsorbent, or by condensation of hydrazine on a cold surface at temperature above the boiling point of ammonia.

What is claimed is:

1. A method for producing hydrazine consisting essentially of the steps of providing a gaseous ammonia feed stream, contacting such feed stream with high energy ionizing radiation at elevated temperature between about 100° C. and 400° C., at least atmospheric pressure and an average residence time of less than 20 seconds; withdrawing the resulting product gas from such contact and immediately separating hydrazine from the product gas.

2. A method for producing hydrazine according to claim 1 in which said high energy ionizing radiation is in the form of electrons from a high voltage accelerator.

3. A method for producing hydrazine according to claim 1 in which said high energy ionizing radiation is in the form of an electron beam current of at least 30 microamperes from a high voltage accelerator.

4. A method for producing hydrazine according to claim 1 in which said high energy ionizing radiation is in the form of fission recoils.

5. A method for producing hydrazine according to claim 1 in which hydrazine is separated from the product gas by scrubbing in a liquid bath and withdrawing the remaining constituents of said product gas from the bath.

6. A method according to claim 1 in which the gaseous ammonia feed streams and said high energy ionizing radiation are contacted at elevated temperatures between about 200° C. and 300° C.

References Cited

UNITED STATES PATENTS

| 2,928,780 | 3/1960 | Harteck et al. | 204—157.1 |
| 3,265,602 | 8/1966 | Steinberg et al. | 204—157.1 |
| 3,342,713 | 9/1967 | Williams. | |
| 3,294,643 | 12/1966 | Guernsey | 204—157.1 X |

H. S. WILLIAMS, *Primary Examiner.*